G. W. CROOKS.
DRILL-TEETH ATTACHMENT.

No. 181,915. Patented Sept. 5, 1876.

Witnesses:
Theodore Hoster
B. S. Clark

Inventor:
George W. Crooks
By Fitch & Fitch
Attys.

UNITED STATES PATENT OFFICE.

GEORGE W. CROOKS, OF KALAMAZOO, MICHIGAN.

IMPROVEMENT IN DRILL-TEETH ATTACHMENTS.

Specification forming part of Letters Patent No. 181,915, dated September 5, 1876; application filed May 4, 1876.

*To all whom it may concern:*

Be it known that I, GEORGE W. CROOKS, of Kalamazoo, county of Kalamazoo, in the State of Michigan, have invented an Improved Drill-Tooth Attachment, of which the following is a full, clear, and exact description, reference being had to the accompanying drawings, forming part of this specification.

My invention relates to a device for preventing the entering of the teeth of grain and other similar drills into the ground to too great a depth during the operation of planting, and the consequent choking of the tooth; and it consists in two curved prongs or leaf-springs carried by a shank-piece, which is adapted to fit upon and be clamped to the rear side of the tooth, the said prongs or springs being divergent from each other, and so curved that their lower ends will rest flat upon the ground, whereby the tooth is sustained at a proper distance in the soil, and is prevented from being broken by the sharp shocks occasioned in passing over rough or stony ground, and whereby the seed or grain dropped by the tooth is not disturbed in its place in the soil, as hereinafter particularly set forth and described.

Figure 1:
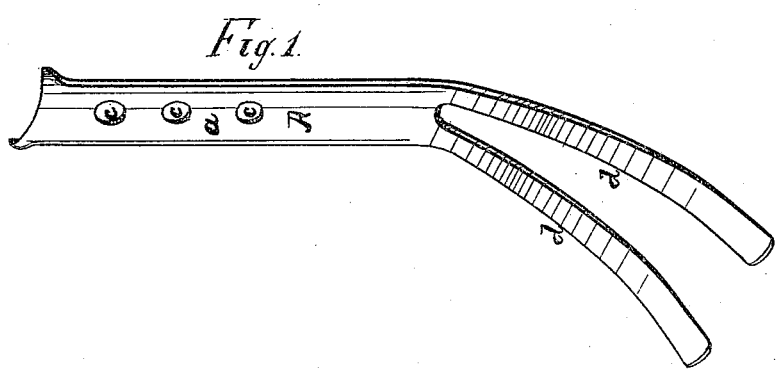
Figure 2:
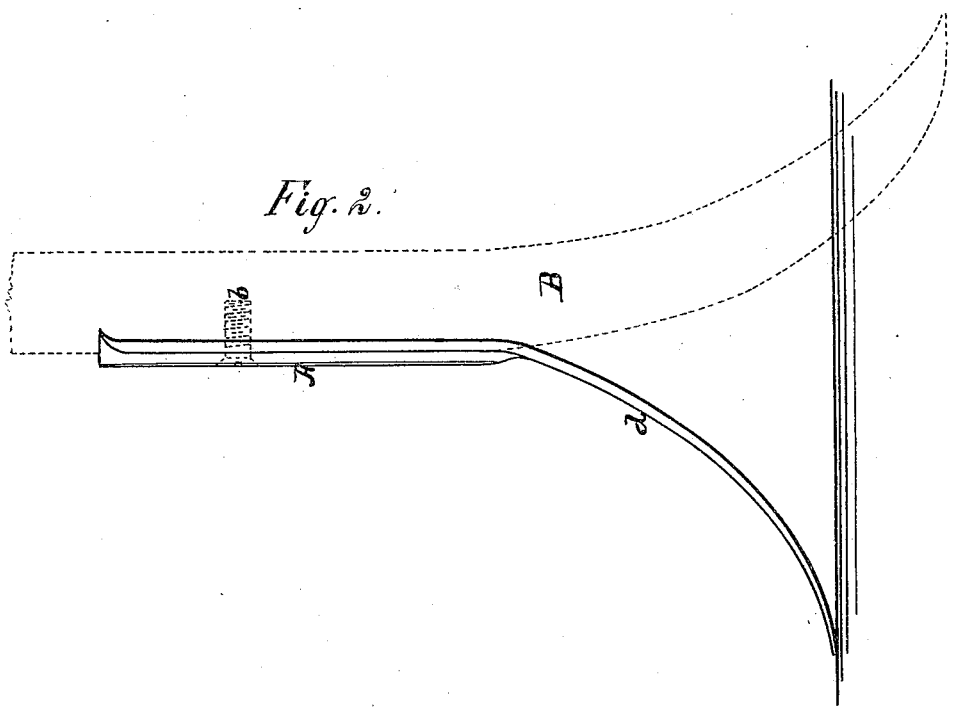

Figure 1 is a view, in perspective, of my improved drill-tooth attachment. Fig. 2 is a side elevation of the same, showing it bolted upon a drill-tooth.

A is my improved drill-tooth attachment. The device is formed with the two prongs or leaf-springs $d$, which are carried by a shank-piece, $a$. The said shank is made to conform on its forward face to the surface of the drill-tooth shown at B, so that when the device is bolted or clamped to the tooth the shank will fit upon the tooth, and, consequently, any side motion of the device on the tooth be prevented. The device is adjustable on the tooth, either higher or lower, by means of openings $c$ in the shank, through which the screw or bolt $b$ is passed in fastening it to the tooth. It is preferable that the prongs and shank should be made in one piece, and the material employed should be spring-steel, so that the prongs or leaf-springs $d$ will be constituted. These said spring-prongs $d$ are curved rearward, as shown, so that their extreme ends will rest flat, or nearly so, upon the soil when the device is attached to the tooth. The said spring-prongs are also divergent from each other from their point of junction with the shank-piece, so that the ends, as they rest upon the ground, will be spread apart, and will have a space between them, the said space being in the line of the course or furrow marked by the tooth, as shown.

It is evident that the spring-prongs $d$ will, by their described position upon the soil in passing over rough or stony ground, receive and break the shocks and blows consequent therefrom, and thus protect the tooth from being broken or injured thereby, while, at the same time, in passing over such uneven soil, the depth to which the tooth will enter the soil will be regulated with an easy and elastic motion of the prongs, and the tooth will sustain no shocks upon its end by being suddenly driven into the soil. It is also evident that the prongs will not disturb the seed or grain dropped in their passage over the ground, but will pass, one on either side of the row, and their action will be to tend to crowd the soil from either side upon, and thus, to some extent, cover the grain in the row.

I am aware that grain-drill teeth have been heretofore provided with projecting and trailing bars or rigid angular pieces clamped upon the teeth, and extending to the rear thereof; and I do not intend, therefore, to claim broadly herein, as a drill-tooth attachment, a bar or piece fixed upon the tooth and extending to the ground, to the rear or side of the tooth; but I wish to limit my claim hereunder to the distinct and specific device shown and described, which is the drill-tooth attachment composed of the rearwardly-curved and divergent spring-prongs carried by a shank clamped or bolted upon the drill-tooth on the rear side thereof, and operating as particularly set forth.

What I claim as my invention, and desire to secure by Letters Patent, is—

The drill-tooth attachment A, having the two rearwardly-curved and divergent spring-prongs $d$, carried by a shank-piece, $a$, and adapted to be clamped or bolted upon the rear of a drill-tooth, as described, and for the purpose specified.

GEO. W. CROOKS.

Witnesses:
WM. G. HOWARD,
WILSON B. FULLER.